Aug. 4, 1925.
A. B. CRONQVIST
1,548,190
SPAR TREE STRAP
Filed Nov. 1, 1924
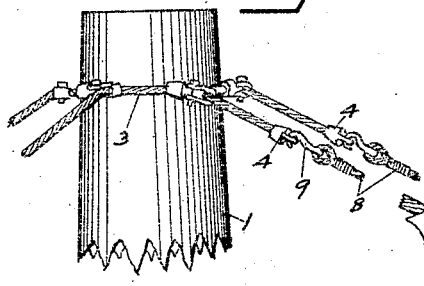
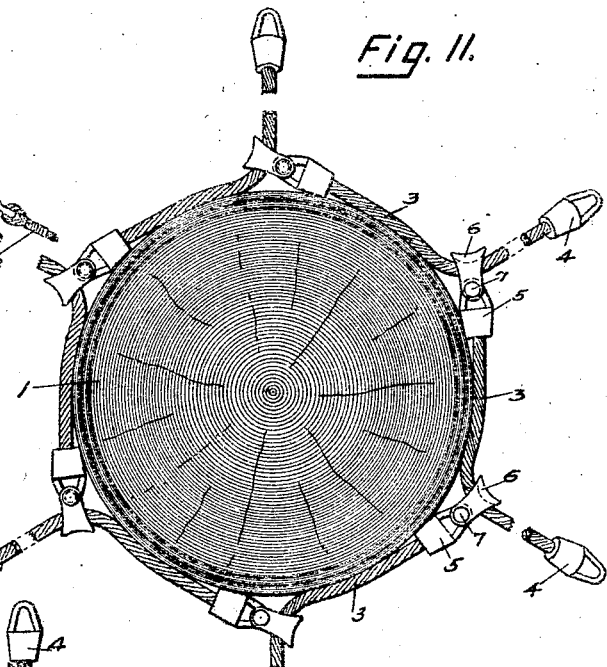
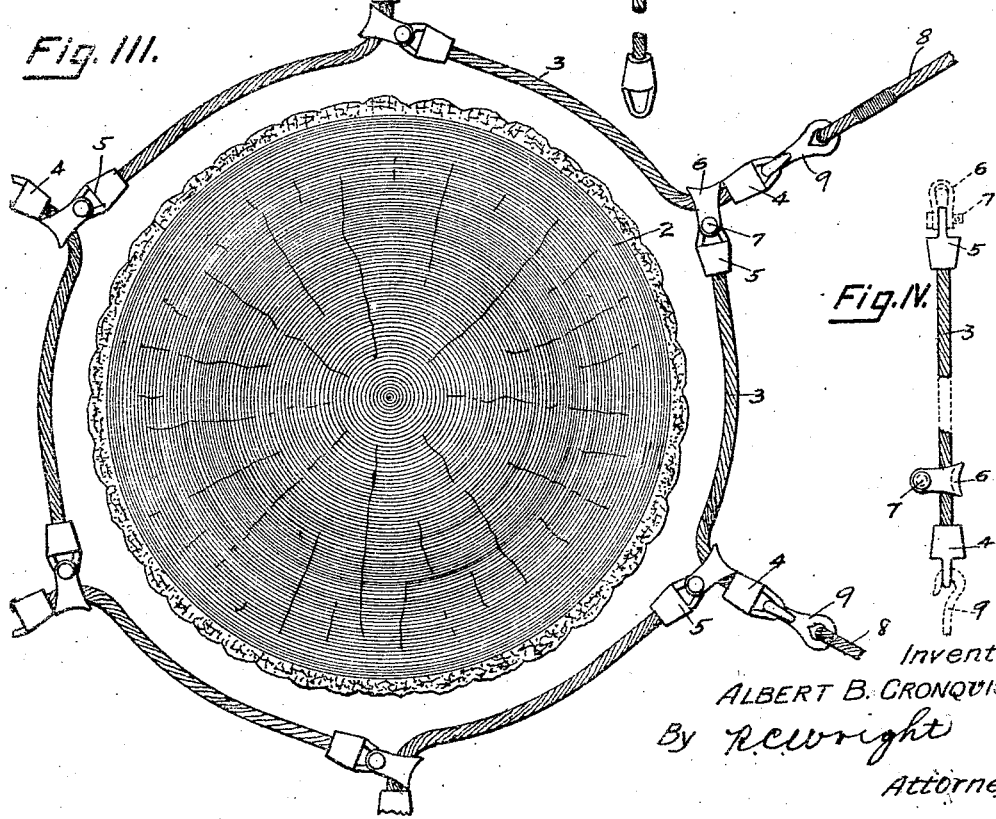
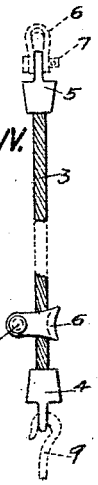
Inventor,
ALBERT B. CRONQVIST.
By R. C. Wright
Attorney.

Patented Aug. 4, 1925.

1,548,190

UNITED STATES PATENT OFFICE.

ALBERT B. CRONQVIST, OF PORTLAND, OREGON.

SPAR-TREE STRAP.

Application filed November 1, 1924. Serial No. 747,233.

*To all whom it may concern:*

Be it known that I, ALBERT B. CRONQVIST, a citizen of the Kingdom of Sweden, residing at Portland, in the county of Multnomah and State of Oregon, have invented a new and useful Improvement in Spar-Tree Straps, of which the following is a specification, reference being had to the accompanying drawings.

My invention relates to guy lines and means connected therewith as a class.

The object of my invention is to provide a link strap adapted to be placed about the top of a spar tree and to which guy lines may be attached for the purpose of securing the spar tree in rigid vertical position.

These objects, as well as other advantages, I attain by the construction, combination and arrangement of parts illustrated in the accompanying drawings which form a part hereof.

Fig. I is a side elevation of the top part of a spar tree, with the link strap about same and guy lines attached to it in operative position.

Fig. II is a plan view of a section of a like part of the tree with the device applied to the same as in Fig. I.

Fig. III is a view of a section of and near the base of a spar tree with the link strap shown loosely apart from the tree in position to be applied to it and raised thereon.

Fig. IV is a detail view of a link of the kind composing the strap.

Like characters refer to like parts in the views.

It is well known, in logging operations, where it is necessary to draw out logs over the land surface, that it has been found most advantageous to select and use what is called a spar tree. This tree is one which is sound, strong, and of the right height and straightness to answer the purpose. A pulley must be attached near the top of this tree, and a cable passes through the pulley. This cable extends from the drum of a donkey engine apparatus, through the pulley and outwardly to a position where its free end may be secured to a log which is to be drawn as mentioned. It is obvious that the upper end of the spar tree must be secured in rigid position by means of guy lines, in order to allow the drawing cable to be successfully operated. Various means have been heretofore used to secure the guy lines to the spar tree top but none of them is like mine, either in construction or in operation and my device will now be described.

In Figs. I and II the upper end 1 of a spar tree is shown. In Fig. III a section 2 near the base of such a tree is shown. The strap device heretofore mentioned is composed of a series of links 3. These links are preferably made of steel cable of common type, as indicated, and are of convenient length. They are also preferably of uniform length. Each link 3 has an eye 4 rigidly secured upon one end of the link. A similar eye 5 is rigidly secured upon the opposite end of the link. A sleeve 6 is pivotally mounted in the eye 5 by means of a pin 7 passing through and near the free ends of the sleeve and the eye 5, the ends of the pin being rigidly secured in the adjacent parts of the sleeve as shown. The sleeve 6 is first slidably mounted upon an opposing link 3 and then connected with the eye 5 by insertion and securing of the pin 7. When the links are thus assembled in a series they compose a complete strap device of circular arrangement. A guy cable or line 8 is also shown. It has a hook 9, rigidly secured at one end and adapted to be hooked in the link eye 4. From the hook 9 the cable 8 extends to any convenient place where its opposite end may be secured upon or near the surface of the soil about the spar tree.

It will now be seen that a sufficient number of the links 3, as may be required and proportioned to the diameter of the spar tree chosen, are arranged in circular form about the base of the tree. This is done by first removing the sleeve pin, inserting the opposing link slidably in the sleeve and replacing the pin. The guy cable is then hooked to the eye 4 of the link. The strap as thus assembled and arranged is shown in Fig. III near the base of the tree and loosely about it. The operator then ascends to the top of the tree and secures a lead block there, through which a line is drawn and attached to the strap with guy cables thereon as shown. The strap, balanced by the cables, is then raised to a position near the tree top by means of the line and the latter removed. The guy lines are then drawn taut from below and their lower ends secured to positions outwardly from the tree. In doing this it will be clearly seen that each guy cable will draw the link to which it is attached through the sleeve of an opposing link and cause all of the links to engage and grapple the upper part of the tree. The series of links thus operating become the strap device as a whole. This strap will grapple the tree rigidly so that its upper part can be held firmly and the tree remain in vertical position by reason of the holding guy cables. The strap is readily and quickly assembled for operation, as any number of links may be kept in supply to arrange the strap to grapple a tree of any dimension selected. As spar trees must be in the most convenient location for logging operations, the strap must be adapted to fit a tree of whatever diameter it may happen to be in that location. My device has this great advantage. It also has the further great advantage that each guy cable draws the links taut and thus there is no longer a dependency upon one place only for this purpose. The apparatus is also easily applied about the tree and more quickly raised to the top than other guy cable securing means, also without any requirement upon the operator to use tools or other means to rigidly secure the guy cables at the tree top. This has been difficult and most inconvenient to accomplish heretofore, besides involving an element of danger to the operator in such work about a tree top. Guy cables secured to the tree by other methods have often slipped or broken away and thus hindered or stopped logging operations, which results in great loss of time and sometimes actual loss by ensuing damages to persons engaged, or to equipment used. My device has been practically demonstrated in actual use and is found to secure the guy cables as described and overcome the previous difficulties of anchoring the tree firmly and safely. These are but a part of its advantages and others become apparent in its daily use.

I claim:

1. In a spar tree strap device, the combination of illustrated parts as follows; a conveniently short link having eyes rigidly secured upon each end thereof, and a sleeve, having a curved inner surface, arranged and adapted to be slidably positioned upon a similar link and thereafter pivotally mounted in one of the eyes of the first mentioned link, the opposing eye of said link being positioned and adapted to receive therein and hold the end of a guy line.

2. In a spar tree strap device, the combination of illustrated parts as follows; a conveniently short link having eyes rigidly secured upon each end thereof, a sleeve, having a curved inner surface, arranged and adapted to be slidably positioned upon a similar link and thereafter pivotally mounted in one of the eyes of the first mentioned link, and a hook arranged and adapted to be secured to one end of a guy line and to engage the eye of said link upon its opposing end.

3. In a spar tree strap device, the combination of illustrated parts as follows; a series of like conveniently short links, each having eyes rigidly secured upon the opposing ends thereof, and a series of sleeves, having curved inner surfaces, arranged and adapted, each to be slidably mounted upon one of said links and thereafter pivotally mounted in one of the eyes of an adjacent link, the free end of the link extending through said sleeve being adapted to receive and hold the end of a guy line in the eye thereof, the series thus assembled forming a strap adjustable about and securable upon an object in rigid position thereon.

4. In a spar tree strap device, the combination of illustrated parts as follows; a series of like conveniently short links, each having eyes rigidly secured upon the opposing ends thereof, a series of sleeves, having curved inner surfaces, arranged and adapted, each to be slidably mounted upon one of said links and thereafter pivotally mounted in one of the eyes of an adjacent link, and a series of hooks arranged and adapted to be secured to one end of guy lines and to engage the eyes of said links on their opposing ends, the series of links thus assembled forming a strap adjustable about and securable upon an object in rigid position thereon.

ALBERT B. CRONQVIST.

Witnesses:
 BLANCHE V. WEBSTER,
 DELIA SMITH WRIGHT.